United States Patent Office 3,495,968
Patented Feb. 17, 1970

3,495,968
HERBICIDAL COMPOSITION AND METHOD OF USE
Harold A. Kaufman, Piscataway, N.J., assignor to Mobil Oil Corporation, a corporation of New York
No Drawing. Original application Dec. 5, 1966, Ser. No. 598,889. Divided and this application Apr. 17, 1969, Ser. No. 817,140
Int. Cl. A01n 9/12, 9/20
U.S. Cl. 71—105          16 Claims

ABSTRACT OF THE DISCLOSURE

Aromatic glyoxylonitrile oximino carbamates are useful to control plant growth, particularly the pre-emergence of undesirable grasses. They may be combined with herbicidal carriers and applied to the soil, seeds, seedlings, and to plants.

Related applications

This application is a division of application Ser. No. 598,889, filed Dec. 5, 1966. It is a companion of application Mobil case 7,337, filed concurrently herewith, which is directed to heterocyclic glyoxylonitrile oximino carbamates for such control of plant growth.

This invention relates to new compounds useful in controlling plant growth. It further relates to a method for killing undesired plant life by applying the said compounds thereto or to the seeds thereof. Still further, the invention relates to plant controlling compositions containing a minor amount of the new compound and a major amount of an inert carrier therefor.

The new compounds of the invention are organoglyoxylonitrile oximino carbamates of the formula

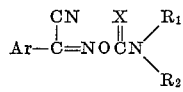

wherein Ar is an organic radical selected from the group consisting of aromatic, heterocyclic, and combinations of these as parts of the same radical, which radical may have substituted thereon a member of the group consisting of hydrogen, halogen, thiocyanato, $NO_2$, $C_1$–$C_4$ alkoxy, $C_1$–$C_4$ haloalkyl, aryl, substituted aryl, aroyl, cyano, $C_1$–$C_4$ alkylmercapto, alkyl sulfonyl, aryl sulfonyl, haloalkyl sulfonyl, $C_2$–$C_5$ carbalkoxy, $C_1$–$C_4$ dialkylamino, amide, $C_1$–$C_6$ alkyl, and $C_3$–$C_6$ cycloalkyl, $R_1$ and $R_2$ are selected from the group consisting of hydrogen, $C_1$–$C_8$ alkyl, $C_2$–$C_8$ alkenyl, cycloalkyl, phenyl, and halophenyl, wherein not more than one of $R_1$ and $R_2$ is hydrogen, and X is a member of the group consisting of oxygen and sulfur.

It will be understood from the above definition of the generic formula that the organic radical may be free of substitution, or it may have one, two, or more of the named substitutents as parts of its nucleus.

Included among the aromatic radicals which form a part of the oximino nucleus are phenyl, naphthyl, indanyl, and other multiple ring radicals containing up to about three rings. The heterocyclic systems contemplated contain a single ring having therein oxygen, sulfur, nitrogen, or combinations thereof. Examples are radicals derived from furan, piperidine, pyridine, morpholine, thiazole, and the like. Included among the systems which contain a combination of aromatic and heterocyclic portions as part of the same radical are quinolinyl, benzothienyl, benzofuranyl, and the like.

As is well known to those familiar with this art, effective control of undesired vegetation governs, to a large degree, yields from food crops. When weeds and other unwanted plants are controlled, one source of competition for the available moisture, nutrients, sunlight, and the like is eliminated. Furthermore, effective control also increases the efficiency of maintenance along roadways and railroad tracks, near industrial buildings, along power line rights-of-way, and the like.

The problems associated with effective control of undesired plants in each of the named areas are quite different. For example, when treating crops, or land which is being prepared for crops, the herbicide chosen must be selective in its activity. That is, it must be able to kill weeds and other unwanted plants, but it must be harmless to the food crop plant growing or to be grown in the treated area. When treating certain other areas, however, it may be desirable to kill all plant life. Such will be the case when treating along power line rights-of-way, and a herbicide which is non-selective will be most useful.

Chemical herbicides are classified generally according to the type of activity possessed thereby. A given compound may possess more than one type of activity depending upon its mode of application and the rate at which it is applied. Herbicides are generally classified as selective or non-selective pre-emergents or post-emergents. The former are applied to the soil before the seeds germinate, and to be effective, they must be in intimate contact with the seeds, or with the germinated seedlings. Since weed seeds will germinate closer to the ground than crop seeds, a non-selective pre-emergence herbicide can be effectively used if its penetration is limited to a depth above the crop seeds. This is not always possible, however.

The most effective pre-emergence herbicide, therefore, is the one which is selective in its nature. If the selected compound will kill seed, germinating seed, and seedlings of undesirable plants without harm to the seed, germinating seed, and seedlings of the crop, there is no danger from over-penetration.

Post-emergence herbicides, on the other hand, are applied after the crop and weeds have attained substantial height. Generally speaking, if a compound is found to have post-emergence activity, it will not be selective. This is in keeping with the observation that, as a rule, herbicidally active compounds will not possess selectivity as the type of plant it will attack. It is thus surprising when a group of compounds is found which selectively kills undesirable plants.

Accordingly, it is a broad object of this invention to provide a new class of herbicides which may be used to selectively kill undesired plants, or which may be used as non-selective eradicants. It is a specific object to provide new organoglyoxylonitrile oximino carbamates which may be used as selective or non-selective herbicides. Other objects and advantages of the present invention will become apparent to those skilled in this art from the following detailed description of the invention.

The compounds of the invention may be prepared in one of two ways. In a first method, one part of an organoglyoxylonitrile oximino sodium salt of the formula

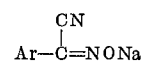

wherein Ar is as above-defined, is reacted with one part of a carbamyl halide of the formula

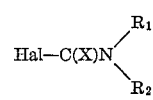

wherein $R_1$, $R_2$ and X are as defined earlier and Hal is halogen, so that the overall reaction may be represented by the equation

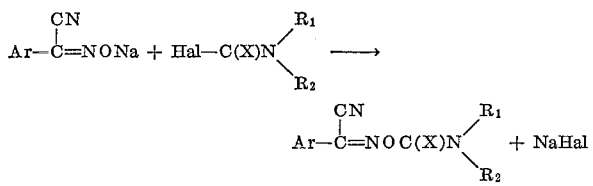

In a second method, a 5 to 10% excess of an appropriate isocyanate or isothiocyanate of the formula $$CH_3NCX$$

wherein X is oxygen or sulfur, is reacted with a free oxime of the formula

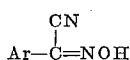

wherein Ar is as already defined. The reaction may be represented by the equation

As can be seen, only those compounds wherein one of $R_1$ and $R_2$ is hydrogen can be prepared by this second method.

The organoglyoxylonitrile oximino salts (e.g., the sodium salt) can be prepared by the method described by J. T. Thurston and R. L. Shriner in J. Org. Chem. vol. 2, pp. 192–193 (1937), in which a cyanide (e.g., benzyl cyanide) is reacted with an appropriate base (e.g., sodium ethoxide) in an alcoholic solvent, followed by addition of butyl nitrite with preparation of the desired oximino salts.

The free oxime can be prepared by acidifying an aqueous solution of the oximino salt with dilute aqueous hydrochloric acid followed by filtering and drying the solid product.

The carbamate compounds of the present invention are stable and well-defined, and are particularly suited for herbicidal use when employed alone or in combination with inert carriers generally utilized in the herbicide art. The carrier adjuvants may be liquid or solid, depending upon the area to be treated, the type of plant to be controlled, and the kind of equipment available for application. When employing liquid formulations, they may be in the form of true solutions, dispersions, or emulsions. The compositions will contain a minor, herbicidal amount, of compound and a major amount of the carrier therefor.

"Solutions," as used herein, means that the compounds of the invention are of molecular size held in true solution by any suitable solvent therefor. It is noted that the inventive compounds are generally water insoluble, thus requiring an organic solvent when true solutions are desirable or necessary. Acetone, for example, can be used as the solvent. Others will be obvious to those skilled in the art.

The term "dispersion" covers those liquid phases in which the active ingredient is colloidal in size and which is distributed throughout as particles held in suspension by wetting agents or by soaps. The dispersive medium is usually totally aqueous, but it may contain small quantities of organic solvent, i.e., amounts not sufficient to cause solution of the active member, as well as a small amount of a wetting agent.

The wetting agents referred to, in addition to aiding in suspending the toxic particles, are useful as aids in uniformly distributing the active material over the area to be treated, particularly when used as post-emergence herbicides. In other words, the wetting agent helps to prevent build-up of droplets on certain portions of the area, whereupon other portions are left untouched or insufficiently treated by the toxicant, and for this reason a wetting agent may be desirable in most liquid and solid formulations. These wetting agents are so well known to the art that it would serve no useful purpose to enumerate them here. As one illustration, Tween–20 (a polyethylene sorbitan monolaurate) is an example of a useful agent which can be used.

Solid formulations contemplated may be bodies of dusts or granules containing herbicidal amounts of the carbamates of this invention. Many solids are known by the art to be useful as herbicidal carriers. Examples of these are kaolin, talc, kieselguhr, diatomaceous earth, pyrophyllite, bentonite, calcium carbonate, powdered cork, wood, walnut shells and peanut shells, fuller's earth, tricalcium phosphate, and the like.

Dust or granular formulations may be prepared by grinding carrier and chemical together, followed by tumbling for a sufficient time to obtain adequate distribution of chemical. However, a more uniform product can be made if the active ingredient is dissolved in a volatile solvent, such as acetone, prior to admixing with the carrier, added to a tumbling mass of carrier, tumbled until well-mixed, and then dried in any convenient manner. The mass may be dried by applying heat thereto while tumbling or by spreading it into a thin layer and allowing it to dry in the open.

Additionally, the inventive compounds may be applied as aerosols, in which case it is convenient to dissolve them in any suitable solvent and to disperse this solution in dichlorofluoromethane or other chlorofluoroalkane having a boiling point below room temperature at ambient pressures. It is contemplated that other suitable materials boiling below room temperature will also be useful for this purpose.

The concentration of the chemicals in the compositions disclosed herein may vary over a wide range provided a herbicidal or toxic dosage thereof is placed upon the plant or in its immediate surroundings. Thus, the important consideration is not minimum and maximum concentrations, but the most economical concentration. The inventive herbicides are effective over the range of from about one pound to about 30 pounds of active ingredient per acre treated, and the most suitable ratio of carrier to active ingredient will depend upon the amounts of each needed to ensure even coverage over the acreage treated.

In controlling undesirable plants with the new chemicals as pre-emergents, the toxicant or compositions containing it may be sprayed (if a liquid) or spread (if a solid) over the ground. Thereafter, the material may be left to the natural action of rainfall, or it may be drenched or plowed and disked into the soil. When used as post-emergents, a solid formulation may be dusted onto the plants by the same method used to apply other well known solid herbicidal compositions. When liquid sprays are employed to treat plants, the liquid composition may be sprayed thereon just to the point of liquid run-off.

Having described the invention in general terms, the following examples of the chemicals of this invention and their use as herbicides are offered. It will be understood that the examples given merely illustrate the invention by way of specific embodiments, and thus are not to be construed as limitations upon it. The invention, with respect to the chemicals themselves and to their use as herbicides, is to be limited only to the extent of the broader definition set forth hereinbefore, the appended claims and reasonable equivalents flowing therefrom. In the examples, "parts" are parts by weight unless otherwise designated.

Example 1

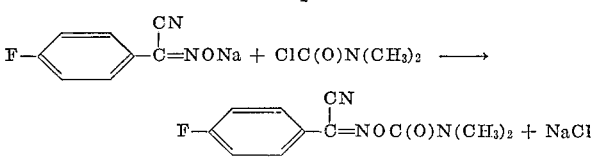

Five parts of p-fluorophenylglyoxylonitrile oximino sodium salt and about 45 parts of benzene were placed in a suitable reactor equipped with a dropping funnel, a stirrer, and a condenser. Three parts of dimethylcarbamyl chloride was added at room temperature, with stirring, whereupon the reaction mixture was heated to reflux, and held there, with stiring, for three hours. Thereafter, the reaction mixture was cooled to 25° C. and was stirred for an additional 15 hours. The sodium chloride which formed during the reaction was removed by filtration, and the reaction solution was taken to dryness to give 7.5 parts of crude product. A portion of the crude product was recrystallized from hexane, the purified product having 17.59% of nitrogen (theory 17.86% nitrogen), and a melting point of 115–117° C.

Example 2

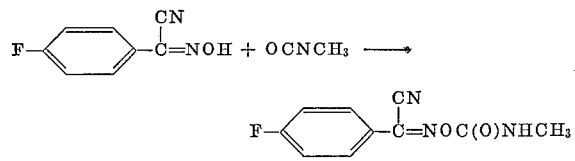

Five parts of p-fluorophenylglyoxylonitrile oxime, 1.64 parts of methyl isocyanate, about 60 parts of toluene, and three drops of dibutyltin diacetate were charged to a pressure bottle and allowed to stand for 16 hours at 100° C. Four parts of product were isolated. The product was a white solid having the following properties: M.P. 175–184° C.

N(calculated), 18.99%; N(found), 18.83%. H(calculated), 3.65%; H(found), 3.80%.

Example 3

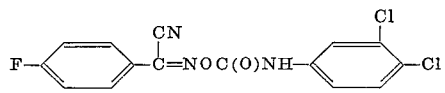

was prepared from p-fluorophenylglyoxylonitrile oxime and 3.4-dichlorophenylisocyanate. It was a solid melting at 193.5–195° C. and contained 11.27% N (theory 11.93% N).

Following substantially the procedures as outlined in Examples 1 and 2 the following compounds were prepared.

| Example | Compound | M.P., °C | Calculated C | H | N | Found C | H | N |
|---|---|---|---|---|---|---|---|---|
| 4 | ⌬—C(CN)=NOC(O)N(CH$_3$)$_2$ | 83–85 | | | 19.35 | | | 19.40 |
| 5 | ⌬—C(CN)=NOC(O)NHCH$_3$ | 170–74 | | | 20.68 | | | 21.28 |
| 6 | CH$_3$—⌬—C(CN)=NOC(O)N(CH$_3$)$_2$ | 132–134 | | | 18.17 | | | 18.10 |
| 7 | (CH$_3$)⌬—C(CN)=NOC(O)N(CH$_3$)$_2$ | 95–97 | | | 18.17 | | | 19.14 |
| 8 | (CH$_3$)⌬—C(CN)=NOC(O)N(CH$_3$)$_2$ | 110–113 | 62.32 | 5.67 | | 62.21 | 5.82 | |
| 9 | CH$_3$—⌬(CH$_3$)—C(CN)=NOC(O)N(CH$_3$)$_2$ | 98–100.5 | | | 17.13 | | | 17.49 |
| 10 | Cl—⌬—C(CN)=NOC(O)N(CH$_3$)$_2$ | 109–115 | | | 16.70 | | | 15.44 |
| 11 | (Cl)⌬—C(CN)=NOC(O)N(CH$_3$)$_2$ | 96.5–98 | | 4.01 | | | 4.65 | |
| 12 | Cl—⌬—C(CN)=NOC(O)NHCH(CH$_3$)$_2$ | 136–140 | 54.24 | 4.55 | | 54.09 | 4.90 | |
| 13 | CH$_3$O—⌬—C(CN)=NOC(O)N(CH$_3$)$_2$ | 103–104 | 58.29 | 5.30 | | 58.41 | 4.94 | |
| 14 | CH$_3$O—⌬—C(CN)=NOC(O)NHCH$_3$ | 182 | | | 18.02 | | | 18.02 |
| 15 | ⌬—N—C(O)—C(CN)=NOC(O)N(CH$_3$)$_2$ | 98.5–102 | | | 22.21 | | | 22.00 |
| 16 | ⌬—N—C(O)—C(CN)=NOC(O)N(CH$_3$)$_2$ | 106–108 | | | 22.04 | | | 21.30 |

| Compound | | M.P., °C. | Elemental Analyses, Percent | | | | | |
|---|---|---|---|---|---|---|---|---|
| | | | Calculated | | | Found | | |
| | | | C | H | N | C | H | N |
| 17 | CH₃O-C₆H₄-C(CN)=NOC(O)N(CH₃)₂ | 96.5–97.5 | | | 17.00 | | | 17.32 |
| 18 | Cl-C₆H₃(Cl)-C(CN)=NOC(O)N(CH₃)₂ | 90.5–91.5 | | | 14.69 | | | 14.60 |
| 19 | C₆H₃(Cl)(Cl)-C(CN)=NOC(O)N(CH₃)₂ | 149.5–154.5 | | | 14.69 | | | 14.31 |

Following are additional examples of compounds which fall within the scope of the invention, and which are prepared substantially in accordance with the method set forth hereinabove.

2,4,5-trichlorophenoxyphenylglyoxylonitrile oximino dimethylcarbamate,
phenylglyoxylonitrile oximino N,N-dibutylcarbamate
p-chlorophenylglyoxylonitrile oximino N,N-diethylthiocarbamate,
m-nitrophenylglyoxylonitrile oximino dimethylcarbamate,
p-nitro-m-methylphenylglyoxylonitrile oximino dimethylcarbamate,
p-cyanophenylglyoxylonitrile oximino dipropylthiocarbamate, and
4-cyano-3,5-dichlorophenylglyoxylonitrile oximino dimethylcarbamate.
o-propoxyphenylglyoxylonitrile oxamino diethylcarbamate,
p-butoxyphenylglyoxylonitrile oximino diethylcarbamate,
m-methyl- and p-methylthiophenylglyoxylonitrile oximino dimethylthiocarbamate,
p-propylthiophenylglyoxylonitrile oximino diethylcarbamate,
p-butylthiophenylglyoxylonitrile oximino dibutylthiocarbamate,
p-methylphenylglyoxylonitrile oximino diethylthiocarbamate,
2,4-dimethylphenylglyoxylonitrile oximino allylcarbamate,
2,4,5-trimethylphenylglyoxylonitrile oximino dimethylcarbamate,
p-propylphenylglyoxylonitrile oximino dibutylcarbamate, and
p-hexylphenylglyoxylonitrile oximino diethylcarbamate.
p-carbomethoxyphenylglyoxylonitrile oximino diethylthiocarbamate,
m-carbethoxyphenylglyoxylonitrile oximino dimethylcarbamate,
p-carbopropoxyphenylglyoxylonitrile oximino dimethylcarbamate,
p-carbobutoxyphenylglyoxylonitrile oximino dipropylthiocarbamate,
4-(dimethylamino)3,5-dinitro phenylglyoxylonitrile oximino dimethylcarbamate,
3-furylglyoxylonitrile oximino diethylcarbamate,
4-tolylsulfurylphenylglyoxylonitrile oximino dimethylcarbamate,
benzothionylglyoxylonitrile oximino dimethylcarbamate,
p-phenylphenylglyoxylonitrile oximino diethylcarbamate,
2′,4′,6′-trichlorophenylphenylglyoxylonitrile oximino dimethylcarbamate,
p-benzoylphenylglyoxylonitrile oximino dimethylcarbamate,
2′,4′,6′-trichlorobenzoylphenylglyoxylonitrile oximino dimethylcarbamate,
p-fluorophenylglyoxylonitrile oximino dioctylcarbamate,
p-fluorophenylglyoxylonitrile oximino diethylcarbamate,
p-nitrophenylglyoxylonitrile dioctenylcarbamate,
2,4-dichlorophenylglyoxylonitrile dicyclohexylcarbamate,
p-chlorophenylglyoxylonitrile diphenylcarbamate, and
o-bromophenylglyoxylonitrile bis(p-chlorophenyl)-carbamate,
1-naphthylglyoxylonitrile oximino dimethylcarbamate,
3-indolylglyoxylonitrile oximino dimethylcarbamate,
4-indanylglyoxylonitrile oximino dimethylcarbamate,
2-pyridylglyoxylonitrile oximino dimethylcarbamate,
5,6,7,8-tetrahydro-1-naphthylglyoxylonitrile oximino dimethylcarbamate,
5-quinolylglyoxylonitrile oximino dimethylcarbamate,
2-thienylglyoxylonitrile oximino dimethylcarbamate,
4-benzofuranylglyoxylonitrile oximino dimethylcarbamate.

The following compounds will illustrate the utility of the compounds of the invention. It is to be understood that they are for the purpose of illustration only.

Herbicide tests

PRE- AND POST-EMERGENCE HERBICIDE TESTS

Method of propagating test species:

Crabgrass—*Digitaria sanquinalis*
Yellow foxtail grass—*Setaria glauca*
Johnson grass—*Sorgum halepense*
Barnyard grass—*Echoinochloa crus-galli*
Amaranth pigweed—*Amaranthus retroflexus*
Turnip—*Brassica sp.*
Cotton—*Gossypium hirsutum* var. DPL smooth leaf
Corn—*Zea mays*
Bean—*Phaseolus vulgaris* var. Black Valentine All crop and weed species were planted individually in 3″ plastic pots containing potting soil. Four seeds each of corn, cotton, and snapbeans were seeded to a depth equal to the diameter of the seed. All other species were surface seeded and sprinkled with screened soil in an amount sufficient to cover the seed. Immediately after planting, all pots were watered by sub-irrigation in greenhouse trays. Pots for the pre-emergence phase were seeded one day before treatment.

Planting dates for the post-emergence phase were varied so that all seedlings would reach the desired stage of development simultaneously. The proper stage of seedling development for treatment in the post-emergence phase is as follows:

Grasses.—2″ in height.
Pigweed and turnips.—1 or 2 true leaves visible above cotyledons.
Cotton.—first true leaf 1″ in length; expanded cotyledons.
Corn.—3″–4″ in height.
Beans.—primary leaves expanded, growing point at primary leaf node.

Method of treatment

Compounds were tested at a rate of application equivalent to 8 lbs. actual compound/acre in a spray volume of 38 gal./acre. Spray hood constants required to deliver the above volume are as follows:

Belt speed.—2 m.p.h.
Air pressure.—adjusted to provide 38 g.p.a. delivery.
Nozzle tip.—to provide uniform cross-section flat spray.

Formulations for spray applications were prepared in 50 ml. volumes with the following three components:
(1) 1.24 grams compound (8 lb./acre rate)
(2) 49 ml. acetone or acetone-water combination.
(3) 1 ml. of Tween 20.

Spray applications were made in a hood containing a movable belt and fixed spray nozzle. For passage through the spray hood, one pot of each species (pre-emergence phase) was placed on the forward half of a wooden flat and one pot of established plants (post-emergence phase) was placed on the rear half of the flat. Treatments were moved to the greenhouse after spraying. Watering during the observation period was done only by sub-irrigation.

Method of recording results

Two weeks after treatment, pre- and post-emergence injury or control was visually rated, and the results were as shown in the following tables.

PRE-EMERGENCE ACTIVITY, PERCENT KILL AT 8 LB./ACRE

| Compound | CG | YF | JG | BG | PW | TP | CT | CN | BN |
|---|---|---|---|---|---|---|---|---|---|
| 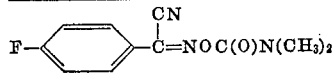 | 90 | 90 | 90 | 90 | 80 | 20 | 0 | 0 | 0 |
| 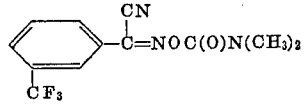 | 80 | | | 40 | 70 | | | 0 | 0 | 0 |
| 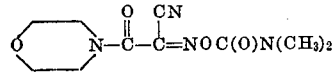 | | | | | 90 | 90 | 0 | 0 | 0 |
| 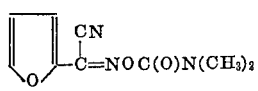 | 40 | | | 80 | | 50 | | 0 | 0 |
| 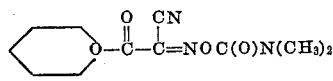 | 40 | | 100 | | 60 | 40 | 0 | 0 | 0 |
| 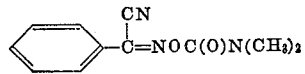 | 90 | 100 | 100 | 100 | 80 | | | | |
| 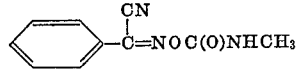 | | | | | | 40 | 0 | 0 | 0 |
| 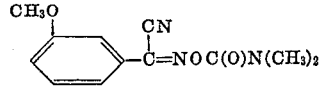 | 90 | 60 | 80 | 90 | 80 | | 0 | 0 | 0 |
| 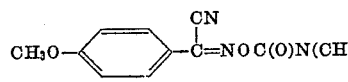 | 70 | | | 40 | 40 | | | 0 | 0 | 0 |
| 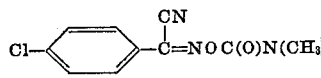 | 90 | 90 | 80 | 90 | 60 | 50 | | | 0 |
| 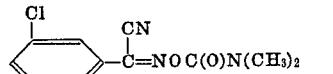 | 100 | 90 | 100 | 90 | | | 0 | 0 | 0 |
| 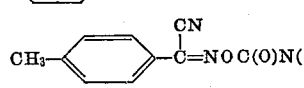 | 80 | 70 | | 40 | | | 0 | | 0 |
| 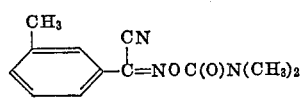 | 90 | 90 | 90 | 90 | | | 0 | 0 | 0 |
|  | 100 | 100 | 90 | 90 | 70 | 40 | 0 | | 0 |
|  | 90 | 100 | 90 | 100 | 50 | | 0 | 0 | 0 |

PRE-EMERGENCE ACTIVITY, PERCENT KILL AT 8 LB./ACRE—Continued

| Compound | CG | YF | JG | BG | PW | TP | CT | CN | BN |
|---|---|---|---|---|---|---|---|---|---|
| 2,3-Cl,Cl-C6H3-C(CN)=NOC(O)N(CH3)2 | 90 | 60 | 30 | 90 | 30 | ...... | 0 | 0 | ...... |
| 3,4-Cl,Cl-C6H3-C(CN)=NOC(O)N(CH3)2 | 70 | 30 | 50 | 30 | 60 | 30 | 0 | 0 | ...... |
| 2,3-Cl,Cl-C6H3-C(CN)=NOC(O)NHCH3 | ...... | ...... | ...... | 40 | 80 | ...... | ...... | ...... | ...... |

POST-EMERGENCE, PERCENT KILL AT 8 LB./ACRE

| Compound | CG | YF | JG | BG | PW | TP | CT | CN | BN |
|---|---|---|---|---|---|---|---|---|---|
| F-C6H4-C(CN)=NOC(O)N(CH3)2 | 60 | 60 | 60 | 70 | ...... | 40 | 50 | 30 | 30 |
| F-C6H4-C(CN)=NOC(O)NHCH3 | 40 | ...... | 40 | ...... | ...... | 40 | 50 | ...... | 40 |
| morpholino-C(O)-C(CN)=NOC(O)N(CH3)2 | 30 | 30 | 40 | 30 | 30 | 40 | 40 | ...... | ...... |
| piperidino-C(O)-C(CN)=NOC(O)N(CH3)2 | 30 | 30 | ...... | 30 | ...... | ...... | ...... | ...... | ...... |
| C6H5-C(CN)=NOC(O)N(CH3)2 | 90 | 90 | 50 | 50 | 80 | 80 | 60 | ...... | 50 |
| 4-CF3-C6H4-C(CN)=NOC(O)N(CH3)2 | 90 | 30 | ...... | 40 | 80 | 40 | 20 | 20 | 30 |
| C6H5-C(CN)=NOC(O)NHCH3 | ...... | ...... | ...... | 30 | ...... | ...... | ...... | ...... | 30 |
| CH3O-C6H4-C(CN)=NOC(O)N(CH3)2 | 90 | 40 | ...... | 30 | 50 | 90 | ...... | ...... | 30 |
| CH3O-C6H4-C(CN)=NOC(O)NHCH3 | ...... | ...... | ...... | ...... | ...... | ...... | ...... | ...... | 30 |
| CH3-C6H4-C(CN)=NOC(O)N(CH3)2 (4-) | 60 | 40 | ...... | ...... | 30 | ...... | ...... | ...... | 30 |
| CH3-C6H4-C(CN)=NOC(O)N(CH3)2 (2-) | 80 | 60 | 40 | 50 | 30 | 80 | 30 | 30 | 50 |
| CH3-C6H4-C(CN)=NOC(O)N(CH3)2 (3-) | 30 | ...... | ...... | ...... | ...... | 30 | ...... | 30 | 30 |
| 3,4-CH3,CH3-C6H3-C(CN)=NOC(O)N(CH3)2 | 90 | 80 | 80 | 40 | 30 | 30 | 40 | ...... | 50 |
| Cl-C6H4-C(CN)=NOC(O)N(CH3)2 | 80 | 30 | ...... | 30 | ...... | 50 | ...... | ...... | 30 |
| 3-Cl-C6H4-C(CN)=NOC(O)N(CH3)2 | 90 | 60 | 50 | 50 | 30 | 90 | 50 | ...... | 100 |
| 3,4-Cl,Cl-C6H3-C(CN)=NOC(O)NHCH3 | ...... | 30 | 30 | 40 | 90 | 100 | 60 | 30 | 40 |

POST-EMERGENCE, PERCENT KILL AT 8 LB./ACRE—Continued

| Compound | CG | YF | JG | BG | PW | TP | CT | CN | BN |
|---|---|---|---|---|---|---|---|---|---|
| 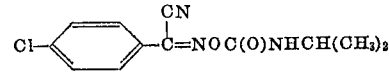 | | 30 | | 30 | | 90 | 40 | | 50 |
| 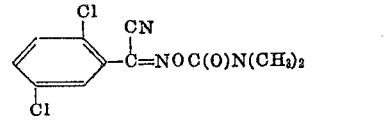 | 40 | 30 | 30 | 50 | 70 | 30 | 70 | 20 | 30 |
| 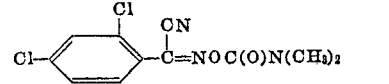 | 70 | 60 | 50 | 90 | 90 | 90 | 40 | 30 | 30 |
| 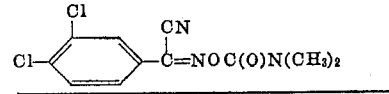 | 50 | 40 | 30 | 40 | 90 | 90 | 60 | 90 | 100 |

I claim:

1. A herbicidal composition comprising a major amount of an inert herbicide carrier and a minor, herbicidal amount of an organoglyoxylonitrile oximino carbamate of the formula

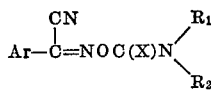

wherein Ar is an organic radical selected from the group consisting of phenyl, naphthyl, tetrahydronaphthyl, indanyl, and phenyl substituted with a member of the group consisting of chlorine, fluorine, bromine, trifluoromethyl, $NO_2$, $C_1$–$C_4$ alkoxy, cyano, $C_1$–$C_4$ alkylmercapto, tolyl sulfonyl, $C_2$–$C_5$ carbalkoxy, $C_1$–$C_4$ dialkylamino, and $C_1$–$C_6$ alkyl, $R_1$ and $R_2$ are selected from the group consisting of $C_1$–$C_8$ alkyl, $C_2$–$C_8$ alkenyl, cyclohexyl, phenyl, chlorophenyl and dichlorophenyl and X is a member of the group consisting of oxygen and sulfur.

2. The composition of claim 1 wherein the carbamate is

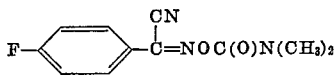

3. The composition of claim 1 wherein the carbamate is

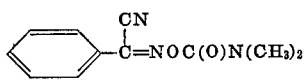

4. The composition of claim 1 wherein the carbamate is

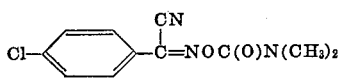

5. The composition of claim 1 wherein the carbamate is

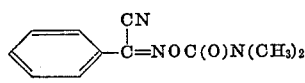

6. The composition of claim 1 wherein the carbamate is

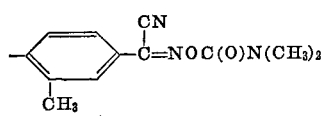

7. The composition of claim 1 wherein the carbamate is

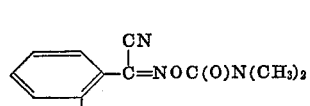

8. The composition of claim 1 wherein the carbamate is

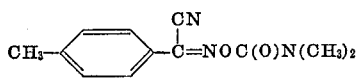

9. A method for killing undesirable plant growth which comprises applying thereto, a herbicidal amount of a carbamate as defined in claim 1.

10. The method of claim 9 wherein the carbamate applied is

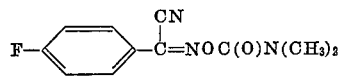

11. The method of claim 9 wherein the carbamate applied is

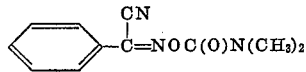

12. The method of claim 9 wherein the carbamate applied is

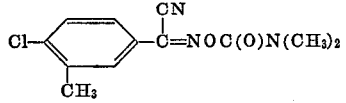

13. The method of claim 9 wherein the carbamate applied is

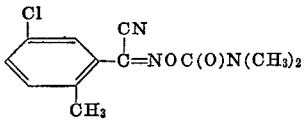

14. The method of claim 9 wherein the carbamate applied is

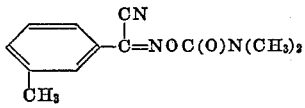

15. The method of claim 9 wherein the carbamate applied is

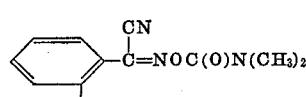

16. The method of claim 9 wherein the carbamate applied is
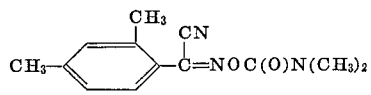
References Cited
UNITED STATES PATENTS
| | | |
|---|---|---|
| 3,063,823 | 11/1962 | Kühle et al. |
| 3,165,392 | 1/1965 | Koopmann _____ 260—566 X |
| 3,223,733 | 12/1965 | Heiss et al. _____ 260—566 |
| 3,234,255 | 2/1966 | Hockmann et al. ___ 260—465 X |
FOREIGN PATENTS
995,313  6/1965  Great Britain.
JAMES O. THOMAS, Jr., Primary Examiner
U.S. Cl. X.R.
71—98

PC 1050
(5/69)

UNITED STATES PATENT OFFICE
CERTIFICATE OF CORRECTION

Patent No. 3,495,968      Dated February 17, 1970

Inventor(s) Harold A. Kaufman

It is certified that error appears in the above-identified patent and that said Letters Patent are hereby corrected as shown below:

Column 2, line 44, after "selectivity as" insert --to--.
Column 3, line 24, formula should read, in part, Column 7, line 36, "oxamino" should be read --oximino--.
Column 7, line 66, "benzothionylglyoxylonitrile" should be read --benzothienylglyoxylonitrile--.
Column 11, line 21, Post Emergence, % Kill at 8 lbs./acre for Bean should read --30-- instead of "40".
Column 11, line 45, Post Emergence, % Kill at 8 lbs./acre for Bean should read --50-- instead of "30".
Column 11, line 60, Post Emergence, % Kill at 8 lbs./acre for Bean should read --80-- instead of "30".
Column 13, line 10, Post Emergence, % Kill at 8 lbs./acre for Bean should read --40-- instead of "30".
Column 13, line 60, Formula in Claim 5 should read, in part,

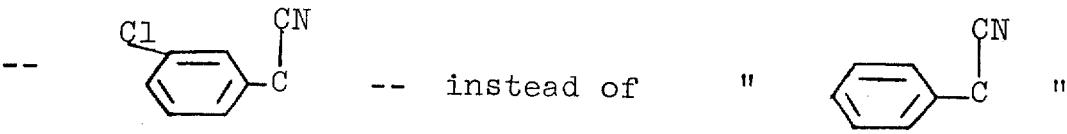

Column 14, line 25, Formula in Claim 8 should read, in part,

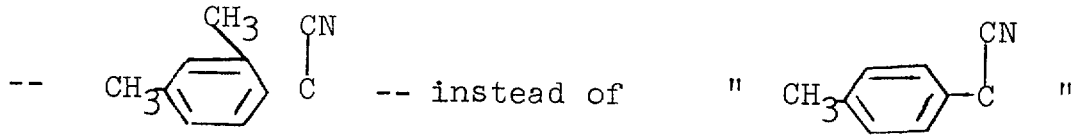

Column 14, line 50, Formula in claim 12 should read, in part, (Continued)

UNITED STATES PATENT OFFICE
CERTIFICATE OF CORRECTION

Patent No. 3,495,968　　　　Dated February 17, 1970

Inventor(s) Harold A. Kaufman　　　　PAGE - 2

It is certified that error appears in the above-identified patent and that said Letters Patent are hereby corrected as shown below:

(Continued)

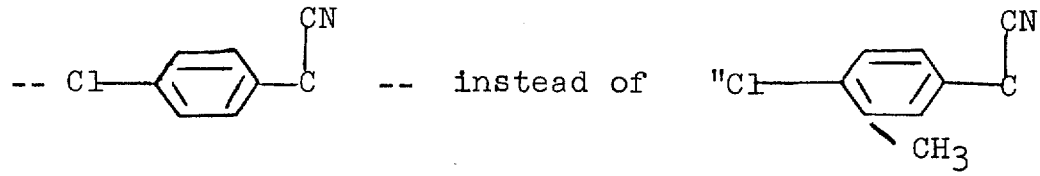 -- instead of --

Column 14, line 55, Formula in Claim 13 should read, in part

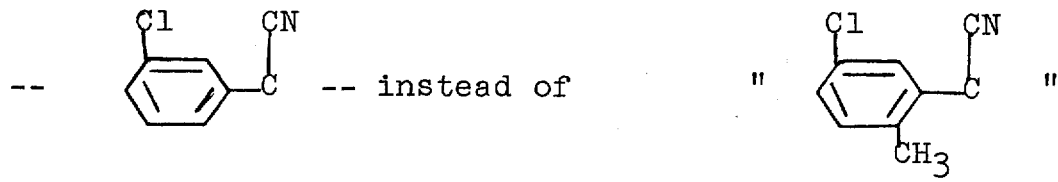 -- instead of --

Signed and sealed this 8th day of December 1970.

(SEAL)
Attest:

EDWARD M. FLETCHER, JR.　　　　WILLIAM E. SCHUYLER, JR.
Attesting Officer　　　　Commissioner of Patents